Figure 3:
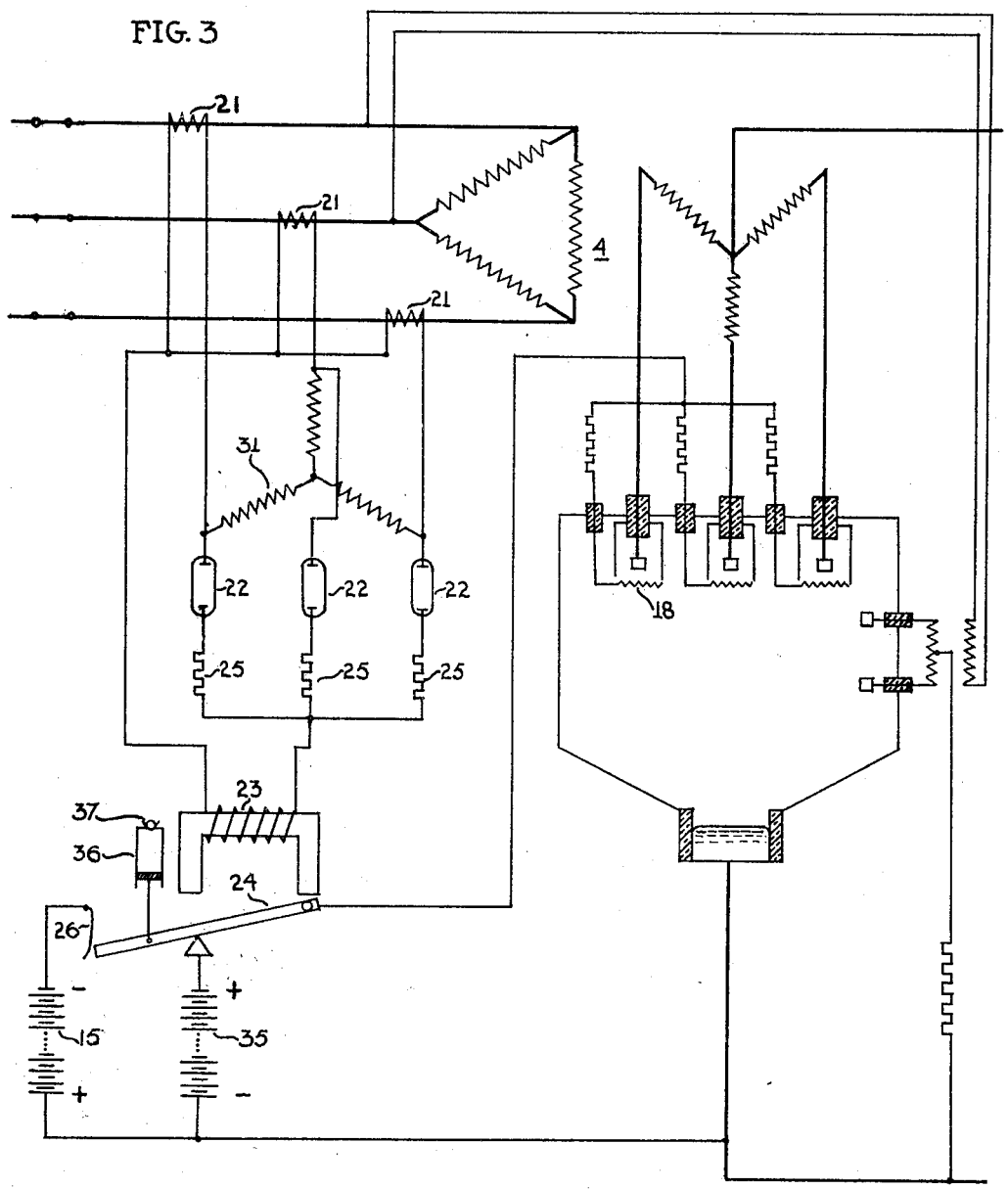

May 3, 1932. F. SIEBER 1,856,857
PROTECTIVE SYSTEM FOR RECTIFIERS
Filed April 9, 1928 2 Sheets-Sheet 1
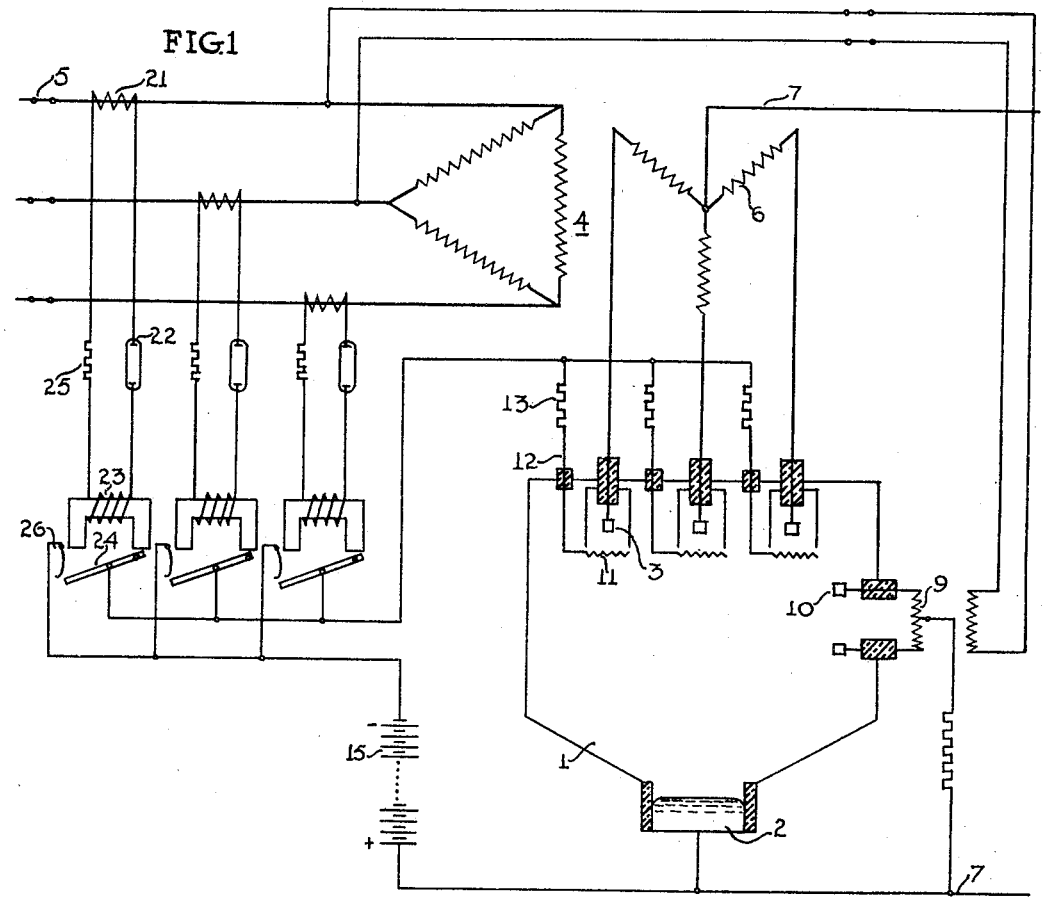
INVENTOR
FRITZ SIEBER
BY Cromwell, Greist & Warden
ATTYS.

May 3, 1932.  F. SIEBER  1,856,857
PROTECTIVE SYSTEM FOR RECTIFIERS
Filed April 9, 1928  2 Sheets-Sheet 2

INVENTOR
FRITZ SIEBER
BY Cromwell, Greist & Warden
ATTYS.

Patented May 3, 1932

1,856,857

UNITED STATES PATENT OFFICE

FRITZ SIEBER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

PROTECTIVE SYSTEM FOR RECTIFIERS

Application filed April 9, 1928, Serial No. 268,731, and in Germany July 21, 1927.

This invention relates to protective systems for rectifiers and it has particular relation to systems applied to mercury arc rectifiers and utilizing grids or screens disposed between the anode and the cathode arranged to be automatically charged so as to suppress back-fire or other abnormal condition in the operation of the rectifier.

Among the objects of the invention is a system of the foregoing character in which the automatic charging of the grid or screen electrodes is effected by instantaneously acting relay means utilizing space discharge tubes responsive to the occurrence of abnormal conditions in the operation of the rectifiers. The use of such tubes enables instantaneous initiation of the protective action of the grids and is very important for the effective action of such rectifier protective systems.

The foregoing and other objects of the invention will be best understood from the following description of exemplifications thereof, reference being had to the accompanying drawings, wherein Fig. 1 is a diagrammatic view of a rectifier system embodying one form of the invention;

Fig. 2 is an elevational view of the discharge tube used in the system of Fig. 1; and Fig. 3 is a view similar to Fig. 1 illustrating an embodiment of another form of the invention.

In the copending application of Stefan Widmer, Serial No. 262,514 filed March 17, 1928, there is described a protective system for rectifiers of the mercury vapor type based on the recognition of the fact that while it is very difficult to stop the back-fire current in a rectifier, it is possible to make such back-fire harmless by producing in the interior of the rectifier a condition which will make it impossible for the then inactive anodes to be brought into action in the further course of the rectifying cycle. To this end protective screens or grids are provided in front of the anodes of the rectifier, and in case of back-fire these grids or screens are charged to a potential which is equal or preferably negative with respect to the cathode. This prevents inactive anodes from starting to carry current, thus stopping the forward or rectifying current flow through the rectifier. As a result, the back-fire is stopped at the next reversal of the direction of current flow through the back-firing anode.

According to my invention, I render grid control of the type described hereinabove particularly effective by utilizing a quick-acting relay means which operates instantaneously under back-fire or short circuit conditions in the rectifier, such relay means utilizing space discharge tubes so arranged and connected that on occurrence of abnormal current flow conditions a suitable control potential will be quickly applied to the protective screens or grids.

Referring to Fig. 1 illustrating a system embodying one form of the invention, a three-phase rectifier 1 has a cathode 2 and three anodes 3. The anodes are supplied from a transformer 4 having a primary winding connected to a three-phase supply line 5 and a secondary winding 6 connected in star to the anodes 3 of the rectifier. Direct-current mains 7 are connected to the cathode 2 and to the star point of the secondary winding 6. An auxiliary exciting transformer 9 supplying exciting anodes 10 serves to maintain the rectifier in excited condition.

As a protection against back-fire each anode is provided with a tubular shield having at its open end a screen or grid 11 the potential of which may be controlled by means of suitable terminal leads 12 extending from the rectifier. Each grid lead has connected in series therewith a suitable current limiting impedance such as a resistor 13, the resistors of the several leads being connected together and being arranged to be connected to the negative pole of a source of biasing potential, such as a battery 15, the positive pole of which is connected to the cathode 2.

According to the invention, the connection of the grid lead terminals to the charging battery 15 is automatically controlled in response to the current flow to the rectifier by means of relay devices utilizing space current discharge tubes so arranged as to secure quick discriminative action. As shown in the drawings, each supply line phase of the transformer 4 is provided with a current transformer 21 which is connected through a space current discharge tube 22 to an actuating coil 23 of a relay switch 24. A resistor 25 is connected in series with the discharge tube 22, the resistance serving to limit the current and to reduce the time constant of the circuit. The relay switch 24 has a movable armature which is picked up when current flows through the actuating coil 23 thereof, closing at its contacts 26 the circuit from the anode grids to the negative pole of the biasing battery 15, thereby charging the grid so as to prevent inactive anodes from starting carrying current in the further course of the rectifying cycle. When the actuating coil 23 is de-energized, the relay switch 24 opens and rectifier action is free to start or go on.

The current in the transformer 21 depends on the magnitude of the load on the supply transformer and an alternating electromotive force will be induced in the secondary of the current transformer corresponding to the magnitude of the load current. The discharge tube 22 is preferably of the evacuated type and may have a shape as shown in Fig. 2. It may be made of glass or some other enveloping material. Two electrodes 28 are mounted within the tube which is so evacuated as to constitute a substantially open circuit as long as the voltage across said electrodes is below a predetermined fixed value and break down permitting current flow between said electrodes when the voltage across the same exceeds a predetermined value. Discharge tubes of such characteristics may, for instance, contain a filling of neon or other suitable gas, the pressure of the gas being such as to secure the aforementioned current discharge characteristics.

As long as the crest value of the alternating electromotive force induced in the secondary current transformer winding 21 is less than the discharge voltage of the discharge tube 22, no current will flow through the actuating coil 23 of the associated relay switch 24 and the rectifier will continue in normal operation. The transformer ratio of the current transformer 21 and the characteristics of the tube 22 and the remainder of the circuit are so chosen that under normal current flow conditions the voltage induced in the secondary winding of the current transformer 21 has a crest value less than the discharge voltage of the tube. Accordingly, under normal operating conditions the resistance of the tube will be practically infinite and no current will flow in the circuit of the actuating coil 23 of the associated relay switch. However, on an abnormal rise of the current through the transformer 4 the voltage induced in the secondary winding of the associated current transformer 21 will exceed the discharge voltage of the tube. This causes breakdown of the tube and a discharge therethrough, which, in turn, results in the energization of the associated relay switch 23 and charging of the anode grids by the battery 15. This cuts out further rectifier action and in the case of an overload or a back-fire, the back-fire current will be stopped at the next reversal of the current, which necessarily is less than the time of half of an alternating current period.

It is desirable to protect the vacuum discharge tube 22 against overloads by designing the current transformer 21 so as to become saturated above a predetermined current or by applying some other method of current limitation in the tube circuit. Instead of an alternating current supply for the discharge relays some other supply may be used, for instance, a direct current derived through a mercury vapor or thermionic rectifier connected to the secondary winding of the current transformer 21.

The number of relays required in a system of the foregoing type depends on the number of supply phases feeding the rectifier. The arrangement may be simplified by making the control dependent on the load symmetry in the different phases instead of on the magnitude of the load. Such arrangement is shown in Fig. 3 in which the three current transformers 21 on the rectifier supply leads are connected in star to three discharge tubes 22 which are also in turn connected, through resistors 25, in star. A single relay switch 24 is used and the actuating coil 23 thereof is connected in circuit between the star point of the three current transformer windings 21 and the star point between the three resistors 25. Suitable star-connected impedance elements 31 are connected between the three leads from the transformers 21 to the associated discharge tubes 22.

Under normal conditions the currents in the supply leads of the main transformer 4 will be balanced and, as a result, the currents induced in the secondary windings of the current transformers 21 will produce balanced current flow conditions in the star-connected impedances 31. However, in case of abnormal current flow conditions in the rectifier, such as on occurrence of a back-fire, the current flowing in the leads to the transformer 4 will become unbalanced. As a result there will appear an unbalanced voltage across the terminals of the impedance 31 to which the discharge tubes 22 are connected. The impedances 31, the transformers 21 and the characteristics of the discharge tubes 22 are so chosen that on occurrence of a dissymmetry between the phases a breakdown of the discharge tubes 22 will take place, energizing the actuating coil of the relay switch 24. This causes the armature of the relay switch 24 to pick up and apply to the grids 11 of the rectifier a negative charging potential sufficient to prevent further flow of rectifying current.

In the arrangement shown in Fig. 3 there is also shown a second grid neutralizing current source in the form of a battery 35 to which the grids 11 are connected when the relay switch 24 is in de-energized condition and the armature thereof is in its lowest position.

In some cases it may be desirable that a certain time should elapse between the stoppage of the discharge tubes 22 and the removal of the charge from the anode grids 11. In such cases, suitable damping means are provided so as to retard the return of the armature of the relay switch 24 to its lower position. In Fig. 3 I have shown such arrangement in the form of a dash-pot 36 provided with a check valve 37 which permits rapid lifting of the armature 24 but retards lowering of the armature. The contact member 26 of the relay switch 24 is so arranged that it establishes contact with the armature through a major portion of the travel of the latter and interrupts the circuit only when the armature is near its lowest position.

The term "grid" as used herein is not intended as a limitation to a particular electrode shape or construction but is used to designate broadly any shape or form of control electrode associated with a cathode and an anode of a device of the class under consideration for controlling the current flow therebetween by controlling the potential conditions on the control electrode.

The invention is not limited to the details of construction and modes of operation and systems of connections described hereinabove, and modifications thereof will suggest themselves to those skilled in the art. It is accordingly desired that the claims be given a broad construction commensurate with the scope of the invention.

I claim:

1. The combination with a rectifier of the gaseous type comprising a cathode, an anode, and a grid interposed between said cathode and anode, of relay means responsive to abnormal current flow conditions in the rectifier for applying to said grid a control potential negative with respect to the cathode to stop the current flow, said relay means including space discharge tube means arranged to abruptly change its conducting condition in response to the occurrence of a predetermined abnormal current flow to said rectifier.

2. In a protective system for rectifiers of the gaseous type including a cathode, an anode, a grid interposed between said cathode and anode, and a source of biasing potential to be applied to said grid, relay means for controlling the application of said control potential to said grid, said relay means including a space current discharge tube, a current transformer associated with said rectifier connected to said discharge tube, and circuit breaking means controlled by the current flow through said discharge tube.

3. In a protective system for rectifiers of the gaseous type including a cathode, an anode, a grid interposed between said cathode and anode, and a source of biasing potential to be applied to said grid, relay means for controlling the application of said control potential to said grid, said relay means including a space current discharge tube, a current transformer associated with said rectifier connected to said discharge tube, circuit breaking means controlled by the current flow through said discharge tube, and means for delaying the opening of said circuit breaking means.

4. In a protective system for rectifiers of the mercury vapor type, a cathode and a plurality of anodes, a grid interposed between said cathode and anodes, an alternating current supply for said rectifier, and a source of current potential for said grid, relay means for applying a control potential from said source to said grid, said relay means including a current transformer associated with said alternating-current supply leads, a space discharge tube supplied from said current transformer, said discharge tube having characteristics whereby it constitutes a substantially open circuit when the voltage thereacross is below a certain value and breaks down when the voltage thereacross is above a predetermined value, and means responsive to the current flow through said discharge tube for applying the control potential from said source to said grid.

5. The combination with a rectifier of the gaseous type comprising a cathode, an anode, and a grid associated with said cathode and anode, of relay means responsive to abnormal current flow conditions in the rectifier for applying a control potential to said grid, said relay means including space discharge tube means connected to respond to abnormal current flow through said rectifier, and means for limiting the maximum current flow through said space discharge tube means.

6. The combination with a rectifier of the gaseous type comprising a cathode, an anode and a grid associated with said cathode and anode, of relay means responsive to abnormal current flow conditions in the rectifier for applying a control potential to said grid, said relay means including space discharge tube means and a transformer connected with said space discharge tube means to cause the same to respond to abnormal current flow through said rectifier, said transformer being saturated to limit the maximum current flow through said space discharge tube means.

7. The combination with a polyphase rectifier device having a plurality of valve phases, a polyphase alternating-current circuit connected to said valve phases, protective grids for said valve phases, and means responsive to an asymmetrical current flow in said phases for controlling said protective grids.

8. In a device of the class described, a polyphase alternating-current system, a plurality of valve elements connected to the phases of said system, grid electrodes for said valve elements, and means responsive to an asymmetrical current flow in said phases for controlling the potential applied to said grid electrodes.

9. In a device of the class described, a polyphase alternating-current system, a plurality of valve elements connected to the phases of said system, protective means for said valve elements, and means responsive to an asymmetrical current flow in said valve elements for actuating said protective means.

In testimony whereof I have hereunto subscribed my name this 19th day of March A. D. 1928, at Zurich, Switzerland.

FRITZ SIEBER.

CERTIFICATE OF CORRECTION.

Patent No. 1,856,857.                                                May 3, 1932.

FRITZ SIEBER.

It is hereby certified that error appears in the printed specification of the above numbered patent requiring correction as follows: Page 3, line 89, claim 4, for "current" read control; and that the said Letters Patent should be read with this correction therein that the same may conform to the record of the case in the Patent Office.

Signed and sealed this 12th day of July, A. D. 1932.

(Seal)

M. J. Moore,
Acting Commissioner of Patents.